(12) United States Patent
Veinotte

(10) Patent No.: US 7,201,159 B2
(45) Date of Patent: Apr. 10, 2007

(54) ELECTRIC ACTUATOR ASSEMBLY AND METHOD FOR CONTROLLING AN EXHAUST GAS RECIRCULATION ASSEMBLY

(75) Inventor: Andre Veinotte, Dresden (CA)

(73) Assignee: Siemens Canada Limited, Chatham (CA)

( * ) Notice: Subject to any disclaimer, the term of this patent is extended or adjusted under 35 U.S.C. 154(b) by 0 days.

(21) Appl. No.: 10/387,439

(22) Filed: Mar. 14, 2003

(65) Prior Publication Data

US 2004/0177838 A1 Sep. 16, 2004

(51) Int. Cl.
*F02M 25/07* (2006.01)
(52) U.S. Cl. ............................................ 123/568.17
(58) Field of Classification Search ........... 123/568.17, 123/568.18, 568.21, 568.23, 568.24; 251/129.11, 251/129.08
See application file for complete search history.

(56) References Cited

U.S. PATENT DOCUMENTS

| | | | |
|---|---|---|---|
| 3,741,179 A | 6/1973 | Vartanian | |
| 3,915,134 A * | 10/1975 | Young et al. .......... | 123/568.24 |
| 4,094,285 A | 6/1978 | Oyama et al. | |
| 4,171,689 A | 10/1979 | Eheim | |
| 4,196,708 A | 4/1980 | May et al. | |
| 4,214,562 A | 7/1980 | Mowbray | |
| 4,222,356 A | 9/1980 | Ueda | |
| 4,230,080 A | 10/1980 | Stumpp et al. | |
| 4,237,837 A | 12/1980 | Toda et al. | |

(Continued)

FOREIGN PATENT DOCUMENTS

EP  0 840 000  5/1998

(Continued)

OTHER PUBLICATIONS

U.S. Appl. No. 10/164,559, filed Jun. 10, 2002, Veinotte, Exhaust Gas Recirculation System.

(Continued)

*Primary Examiner*—Stephen K. Cronin
*Assistant Examiner*—Arnold Castro

(57) ABSTRACT

A exhaust gas recirculation assembly for an engine having an intake manifold and an exhaust manifold, the exhaust gas recirculation assembly including a flow control body, a closing member, an electric motor coupled to the closing member, and an electronic controller electrically connected to the electric motor. The flow control body includes a manifold conduit and an inlet conduit in fluid communication with the manifold conduit. The manifold conduit includes a recirculation opening and a mounting member. The mounting member is adapted to connect the manifold conduit in fluid communicate with the intake manifold. The inlet conduit includes a mounting member adapted to connect the inlet conduit in fluid communication with the exhaust manifold. The closing member is movably mounted in the manifold conduit and has a first position where the closing member closes the recirculation opening and blocks fluid communication between the inlet conduit and the manifold conduit and a second position where the closing member opens the recirculation opening and permits fluid communication between the inlet conduit and the manifold conduit and creates a pressure differential across the recirculation opening to mix fluid flowing from the inlet conduit with fluid flowing in the manifold conduit. The electronic controller selectively controls the operation of the electric motor to drive the closing member between the first position and the second position such that the fluid from the inlet conduit is mixed with the fluid flowing in the manifold conduit in a sufficient amount for combustion in the engine.

25 Claims, 6 Drawing Sheets

U.S. PATENT DOCUMENTS

| | | | |
|---|---|---|---|
| 4,279,235 A | 7/1981 | Flaig et al. | |
| 4,279,473 A | 7/1981 | Yamana | |
| 4,280,470 A | 7/1981 | Ueda | |
| 4,286,567 A | 9/1981 | Ueda | |
| 4,295,456 A | 10/1981 | Nomura et al. | |
| 4,329,965 A | 5/1982 | Ueda et al. | |
| 4,364,369 A | 12/1982 | Nomura et al. | |
| 4,690,119 A * | 9/1987 | Makino et al. | 123/568.23 |
| 5,305,720 A | 4/1994 | Ando et al. | |
| 5,333,456 A | 8/1994 | Bollinger | |
| 5,937,834 A | 8/1999 | Oto | |
| 5,937,835 A * | 8/1999 | Turner et al. | 123/568.24 |
| 6,102,016 A * | 8/2000 | Sitar et al. | 123/568.23 |
| 6,135,415 A * | 10/2000 | Kloda et al. | 251/129.11 |
| 6,382,195 B1 * | 5/2002 | Green et al. | 123/568.23 |
| 6,435,169 B1 * | 8/2002 | Vogt | 123/568.23 |
| 6,494,041 B1 | 12/2002 | Lebold | |
| 2002/0185116 A1 | 12/2002 | Veinotte | |
| 2003/0084887 A1 | 5/2003 | Veinotte | |
| 2003/0111066 A1 | 6/2003 | Veinotte | |
| 2003/0116146 A1 * | 6/2003 | Fensom et al. | 123/568.21 |
| 2004/0177839 A1 | 9/2004 | Veinotte | |

FOREIGN PATENT DOCUMENTS

| | | |
|---|---|---|
| JP | 11 294267 | 10/1999 |
| JP | 2000-45879 | 2/2000 |

OTHER PUBLICATIONS

U.S. Appl. No. 10/290,441, filed Nov. 8, 2002, Veinotte, Modular Exhaust Gas Recirculation Assembly.

U.S. Appl. No. 10/465,867, filed Jun. 20, 2003, Veinotte, et al, Purge Control Device for Low Vacuum Condition.

* cited by examiner

ELECTRIC ACTUATOR ASSEMBLY AND METHOD FOR CONTROLLING AN EXHAUST GAS RECIRCULATION ASSEMBLY

BACKGROUND OF THE INVENTION

One conventional exhaust gas recirculation (EGR) system for compression ignition internal combustion engines uses two actuators. The first actuator creates a pressure differential in the intake conduit that draws exhaust gas from the exhaust conduit into the intake conduit where it mixes with the intake charge. The second actuator regulates the flow rate of exhaust gas in the exhaust conduit that is drawn into the intake conduit by the first actuator.

Another conventional EGR system employs a single actuator to regulate the flow rate of exhaust gas drawn into the intake conduit from the exhaust conduit. A stationary throttling device is located in the exhaust conduit to promote the flow of exhaust gas into the intake conduit. The negative pressure pre-existing in the intake conduit created during the intake stroke of the engine provides the pressure differential needed to draw the exhaust gas into the intake conduit.

SUMMARY OF THE INVENTION

There is provided a exhaust gas recirculation assembly for an engine having an intake manifold and an exhaust manifold, the exhaust gas recirculation assembly including a flow control body, a closing member, an electric motor coupled to the closing member, and an electronic controller electrically connected to the electric motor. The flow control body includes a manifold conduit and an inlet conduit in fluid communication with the manifold conduit. The manifold conduit includes a recirculation opening and a mounting member. The mounting member is adapted to connect the manifold conduit in fluid communicate with the intake manifold. The inlet conduit includes a mounting member adapted to connect the inlet conduit in fluid communication with the exhaust manifold. The closing member is movably mounted in the manifold conduit and has a first position where the closing member closes the recirculation opening and blocks fluid communication between the inlet conduit and the manifold conduit and a second position where the closing member opens the recirculation opening and permits fluid communication between the inlet conduit and the manifold conduit and creates a pressure differential across the recirculation opening to mix fluid flowing from the inlet conduit with fluid flowing in the manifold conduit. The electronic controller selectively controls the operation of the electric motor to drive the closing member between the first position and the second position such that the fluid from the inlet conduit is mixed with the fluid flowing in the manifold conduit in a sufficient amount for combustion in the engine.

There is also provided a modular exhaust gas recirculation assembly including a flow control body, an actuator receptacle, a closing member, an electric actuator assembly mounted in the actuator receptacle, and an actuator cover extending over the electric actuator assembly and connected to the actuator receptacle to enclose the electric actuator assembly. The flow control body includes a manifold conduit having an inner surface defining a fluid passageway, and an inlet conduit in fluid communication with the manifold conduit. The closing member is movably mounted in the manifold conduit between a first position where the closing member lies adjacent to the inner surface the manifold conduit and blocks fluid communication between the manifold conduit and the inlet conduit, and a second position where the closing member extends into the fluid passageway of the manifold conduit and opens fluid communication between the manifold conduit and the inlet conduit such that when fluid is flowing through the manifold conduit fluid flowing in the inlet conduit is drawn into the manifold conduit. The electric actuator assembly is coupled to the closing member and drives the closing member between the first position and the second position. The actuator receptacle extends along at least a portion of one of the manifold conduit and the inlet conduit.

There is yet also provided a method for controlling exhaust gas recirculation for an internal combustion engine including a manifold conduit in fluid communication with an inlet conduit, and a closing member selectively opening and closing the fluid communication between the manifold conduit and the inlet conduit, the method including the step of driving an electric motor to position the closing member at one of a first position where the closing member blocks fluid communication between the manifold conduit and the inlet conduit and a second position where the closing member opens fluid communication between the manifold conduit and the inlet conduit.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
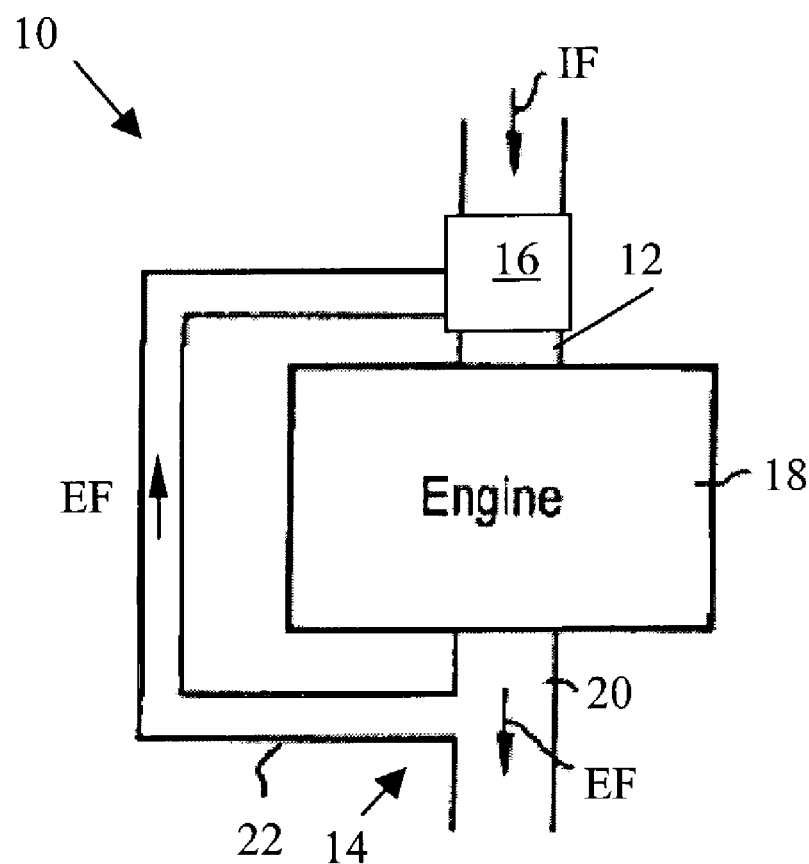
FIG. 1 is a schematic in accordance with an EGR system of an internal combustion engine according to the present invention.
Figure 2:
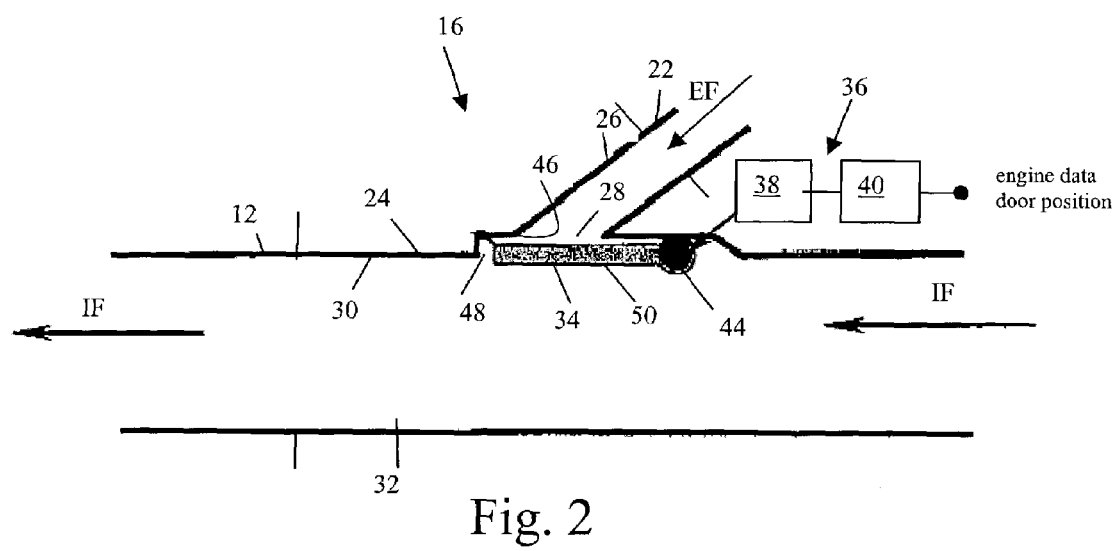
FIG. 2 is a schematic of the EGR system of FIG. 1 with the closing member in a first operating condition.
Figure 3:
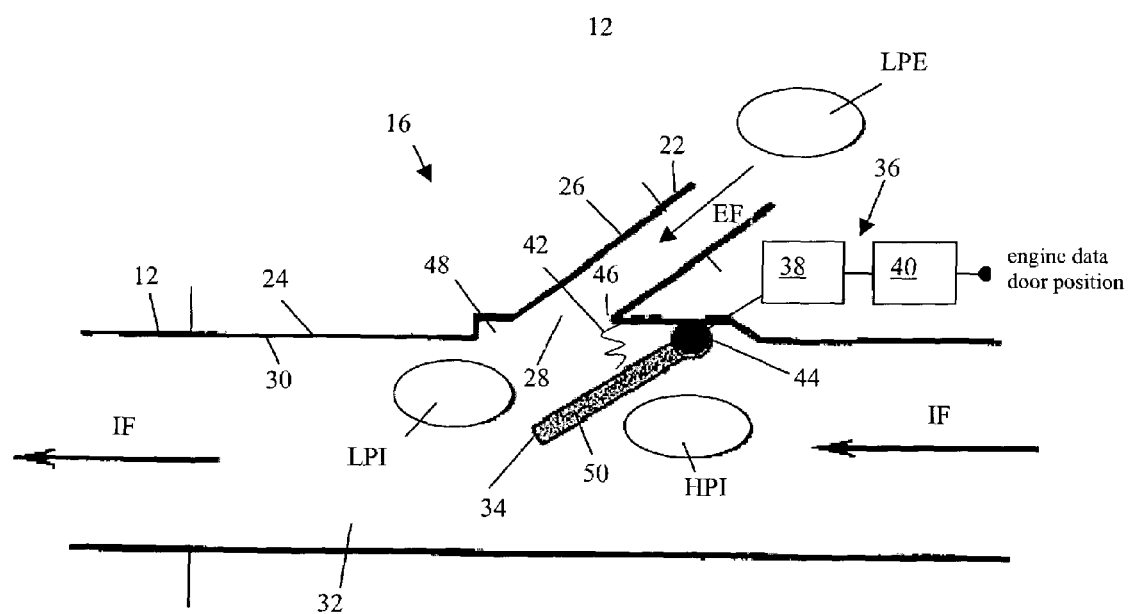
FIG. 3 is a schematic of the EGR system of FIG. 1 with the closing member in a second operating condition.

Referring to FIGS. 1–3, a first configuration of an exhaust gas recirculation (EGR) system 10 includes an intake conduit 12, an exhaust conduit 14 in fluid communication with the intake conduit 12 and a flow control body 16 between the intake conduit 12 and the exhaust conduit 14 to selectively open and close the fluid communication between the intake conduit 12 and the exhaust conduit 14. The intake conduit 12 can be a manifold in fluid communication with a plurality of combustion chambers (not shown) of an internal combustion engine 18. The exhaust conduit 14 can include an exhaust manifold 20 in fluid communication with the combustion chambers of the internal combustion engine 18 and a recirculation conduit 22 in fluid communication with the exhaust manifold 18 and the flow control body 16.

The EGR system 10 can be used with the internal combustion engine 18 to control the emissions of the engine 18 when the amount of exhaust gas flowing in the exhaust conduit 14 enters the intake conduit 12 to mix with an intake charge flowing in the intake conduit 12 on route to a combustion chamber (not shown) of the engine 18. The EGR system 10 can be used with a compression-ignition engine or a spark-ignition engine. Preferably, the EGR system 10 is used in a compression-ignition engine.

Referring to FIGS. 2 and 3, the flow control body 16 includes a manifold conduit 24 in fluid communication with the intake conduit 12 and an inlet conduit 26 in fluid communication with the manifold conduit 24 and the recirculation conduit 22 of the exhaust conduit 14. The manifold conduit 24 includes a recirculation opening 28 and an inner surface 30 defining a fluid passageway 32.

A closing member 34 is movably mounted in the manifold conduit 24. The closing member 34 performs two functions. First, it opens and closes the recirculation opening 28 to selectively open and close the fluid communication between the intake conduit 12 and the exhaust conduit 14. Second, after the closing member 34 opens the fluid communication between the intake conduit 12 and the exhaust conduit 14, the closing member 34 meters the flow rate of exhaust gas that passes from the exhaust conduit 14 to the intake conduit 12.

An actuator assembly 36 includes a servo assembly 38 drivingly coupled to the closing member 34 and a servo controller 40 electrically connected to the servo assembly 38 and a return spring 42 biasing the closing member 34 toward the recirculation opening 28. Preferably, the servo assembly 38 includes an electric motor (not shown) drivingly coupled to a gear train (not shown). The servo controller 40 generates an actuator signal and sends it to the servo assembly 38 to move the closing member 34 from the first position to the second position. Preferably, the servo controller 40 follows a closed-loop algorithm using an engine performance data input and a door position input. Alternatively, the servo controller 40 can follow an open-loop algorithm and additional inputs can be provided to the servo controller 40, such as transmission gear selection and vehicle inclination.

Comparing FIGS. 2 and 3, the closing member 34 is movable between a first position (FIG. 2) where the closing member 34 blocks fluid communication between the intake conduit 12 and the exhaust conduit 14 and a second position (FIG. 3) where the closing member 34 opens fluid communication between the intake conduit 12 and the exhaust conduit 14 and selectively meters the flow rate of exhaust gas passing into the intake conduit 12. The exhaust gas flows through the recirculation conduit 22 in the direction indicated by arrow EF.

FIGS. 2 and 3 schematically represent the closing member 34 as a door pivoting at one end about a rotary shaft 44. Alternatively, the closing member 34 can be displaced in a different manner between the first position and the second position, such as sliding along a linear path. The servo assembly 38 can include any suitable driving mechanism that imparts the chosen pivoting motion, linear motion or other motion on the closing member, such as, an electric motor with or without a gear train, or a solenoid with or without a linkage.

When in the first position, as shown in FIG. 2, the closing member 34 lies adjacent the inner surface 30 of the intake conduit 12 and engages a seat 46 surrounding the recirculation opening 28 to seal the recirculation opening 28 and block the flow of exhaust gas from the recirculation conduit 22 into the intake conduit 12. Preferably, the closing member 34 is positioned in the fluid passageway 32 to minimize disturbance by the closing member 34 of the fluid flowing in the fluid passageway 32 when the closing member 34 is in the first position. As shown in FIGS. 2 and 3, this can be achieved by providing a recess 48 at a location in the inner surface 30 which surrounds the recirculation opening 28. The recess 48 receives the closing member 34 so that the closing member 34 lies approximately coplanar with the inner surface 30 when the closing member 34 is in the first position. Alternatively, a ramp can be providing on the inner surface 30 that diverts the fluid flowing in the fluid passageway 32 over the closing member 34.

When in the second position, as shown in FIG. 3, the closing member 34 is disengaged from the valve seat 46 to open the recirculation opening 28 and permit fluid communication between the recirculation conduit 22 and the intake conduit 12. In the second position, the closing member 34 extends away from recirculation conduit 22 and extends into the fluid passageway 32 to affect the fluid flowing in the intake conduit 12. By extending into the fluid passageway 32, the closing member 22 creates a high pressure region HP1 in the intake passage 12 that is upstream of the recirculation opening 28 and an intake low pressure region LP1 in the intake conduit 12 that is downstream of and adjacent to the recirculation opening 28. The closing member 34 can vary the pressure value of the intake low pressure region LP1 by the amount to which it extends into the fluid passageway 32. As will be explained below, by varying the pressure value of the intake low pressure region LP1, the closing member 34 can meter the volume of exhaust gas entering the intake conduit 12 from the recirculation conduit 22.

During the intake cycle of the engine, the exhaust conduit 14 has a low pressure region LPE that is approximately equal to ambient atmospheric pressure. The closing member 34 further includes an operative surface 50 that causes the fluid flowing in the fluid passageway 32 to separate from a portion of the inner surface 30 adjacent the recirculation opening 28. This separation creates the intake low pressure region LP1. When the closing member 34 initially extends into the fluid passageway 32 (e.g., 10 degrees relative to a plane containing the recirculation opening), partial separation of the fluid occurs and the value of the intake low pressure region LP1 is less than a maximum value. When the closing member extends far enough into the fluid passageway 32 to cause full separation (e.g., 35 degrees relative to a plane containing the recirculation opening), then the value of the intake low pressure region LP1 reaches a maximum value. Thus, the extent to which of the operative surface 50 reaches into the fluid passageway 32 controls the value of the intake low pressure region LP1 and, thus, the pressure differential between the exhaust low pressure region LPE and the intake low pressure region LP1 during the intake cycle of the engine 18.

The geometry of the operative surface 50 is, preferably, different in shape than the boundary configuration of the fluid passageway 32 to provide an adequate value for the intake low pressure region LP1 and to promote mixing of the exhaust gas from the exhaust conduit 14 with the fluid flowing in the fluid passageway 32. Preferably, the exhaust gas is mixed with the fluid flowing in the fluid passageway 32 so that each combustion chamber (not shown) of the engine receives at least some of the exhaust gas passing through the recirculation opening 28. The selected geometry must balance with the capacity of the actuator assembly 36 and the effect the operative surface 50 has on flow restriction in the intake conduit 12. The actuator assembly 36 should be of a configuration capable of generating sufficient force to move the closing member 34 between the first position and second position against the resistance created by the fluid flowing in the fluid passageway 32 against the closing member 34 while simultaneously requiring a minimum packaging volume. It is preferred that the restriction of the fluid passageway 32 by the closing member 34 minimally affect the fluid flowing through the fluid passageway 32 to the combustion chamber during the intake cycle and, thus, the power production of the engine 18.

The geometry of the operative surface 50 and the relationship between the angle of the closing member 34 and the amount of exhaust gas that enters the fluid passageway 32 are described in the U.S. patent application filed on Nov. 8, 2002, entitled "Apparatus and Method for Exhaust Gas Flow Management of an Exhaust Gas Recirculation system," U.S. application Ser. No. 10/290,497, which application is hereby incorporated by reference.

The pressure of the fluid flowing in the intake conduit 12 is approximately equal to ambient atmospheric pressure if the engine is a normally aspirated engine and is greater than ambient atmospheric pressure if the engine is a turbocharged engine. As the closing member 34 moves away from the recirculation conduit 22 and toward the second position (FIG. 3), the intake low pressure region LPI is created adjacent the recirculation opening 28 and has a value slightly less than that of the ambient atmospheric pressure. As the closing member 34 moves farther into the fluid passageway toward the second position, the value of the intake low pressure region LPI approaches vacuum pressure. The pressure differential between the intake low pressure region LPI in the intake conduit 12 and the exhaust low pressure region LPE in the recirculation conduit 22 draws exhaust gas from the exhaust conduit 14 into the intake conduit 12 through the recirculation opening 28. The amount of exhaust gas that enters the intake conduit 12 is proportional to the pressure differential between the intake low pressure region LPI and the exhaust low pressure region LPE. The pressure value of the exhaust low pressure region LPE remains relatively steady over time. Thus, a change in the flow rate of exhaust gas in the intake conduit 12 can be varied by varying the pressure value of the intake low pressure region LPI.

The extent to which of the closing member 34 reaches into the fluid passageway controls the value of the intake low pressure region LPI and, thus, the pressure differential between the intake low pressure region LPI and the exhaust low pressure region LPE during the intake cycle of the engine. When the closing member 34 first opens, the closing member 34 reaches into the fluid passageway 32 by a small amount and the intake low pressure region LPI has a value only slightly less than that of the exhaust low pressure region LPE. Accordingly, the pressure differential is small and the flow rate of exhaust gas through the recirculation opening 28 and into the intake conduit 12 is correspondingly small. The pressure value of the intake low pressure region LPI, and thus the pressure difference and flow rate of exhaust gas passing through the recirculation opening 28, increases as the closing member 34 reaches farther into the fluid passageway 32 of the manifold conduit 24. Therefore, closing member 34 opens fluid communication between the intake conduit 12 and the exhaust conduit 14 and the closing member 34 also meters the amount of exhaust gas passing into the intake conduit 12.

FIGS. 4–7 illustrate an embodiment of a modular exhaust gas recirculation assembly 100 according to the EGR system 10 schematically represented in FIGS. 1–3. The modular exhaust gas recirculation assembly 100 integrates a flow control body 116, a closing member 134, and an electric actuator assembly 136 into a modular unit. The modular exhaust gas recirculation assembly 100 can be configured as a single component for assembly with the engine. This can reduce the part count for the engine. The modular exhaust gas recirculation assembly 100 is assembled to the engine by connecting the modular exhaust gas recirculation assembly 100 to each of the intake conduit and the exhaust conduit and the number of assembly steps can be minimized because the number of components for assembly is reduced.

The flow control body 116 includes a manifold conduit 124 and an inlet conduit 126 in fluid communication with the manifold conduit 124. As described above with reference to FIGS. 1–3, the manifold conduit 124 can be placed in fluid communication with an intake conduit (e.g., at 12 in FIGS. 1–3) and the inlet conduit 126 can be placed in fluid communication with a recirculation conduit of the exhaust conduit (e.g., 22 and 14 in FIGS. 1–3).

Figure 4:
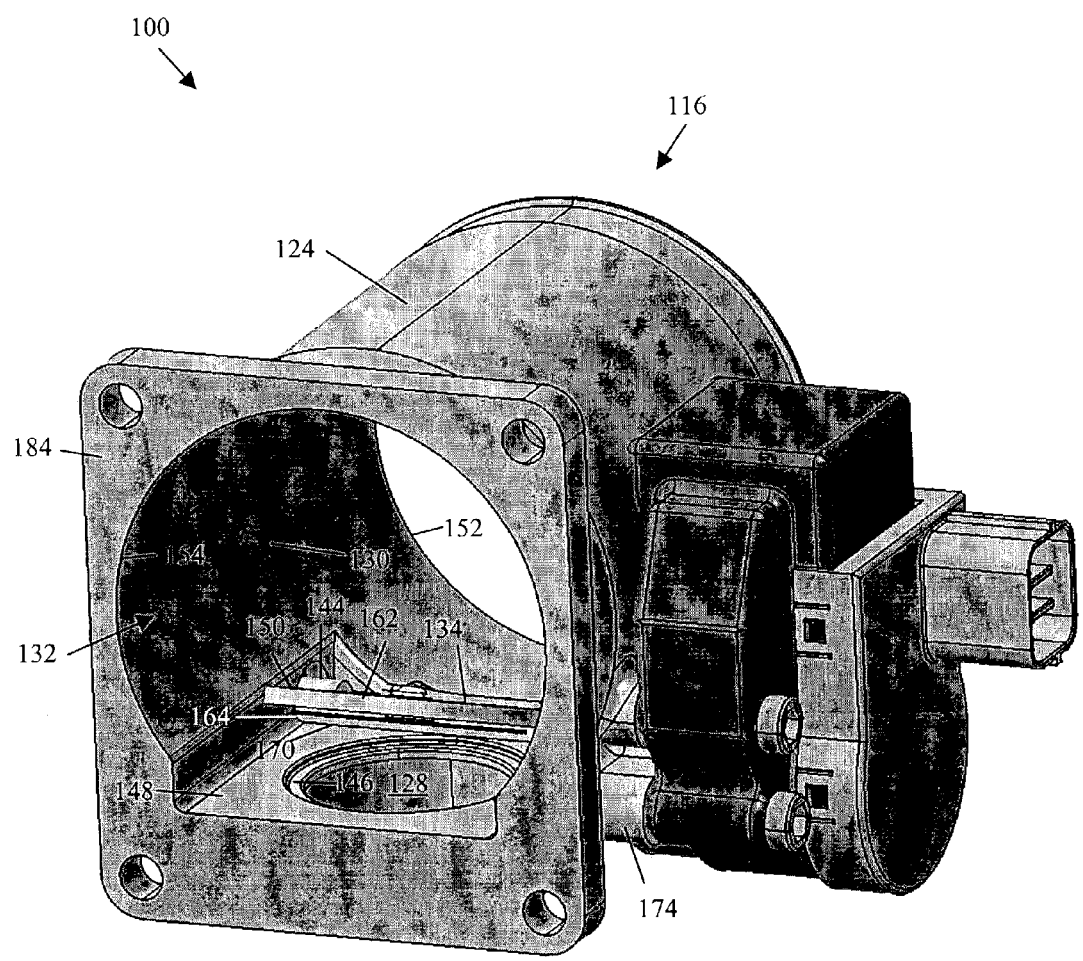
FIG. 4 is a perspective view of an embodiment of an exhaust gas recirculation assembly for an EGR according to the invention.
Figure 5:
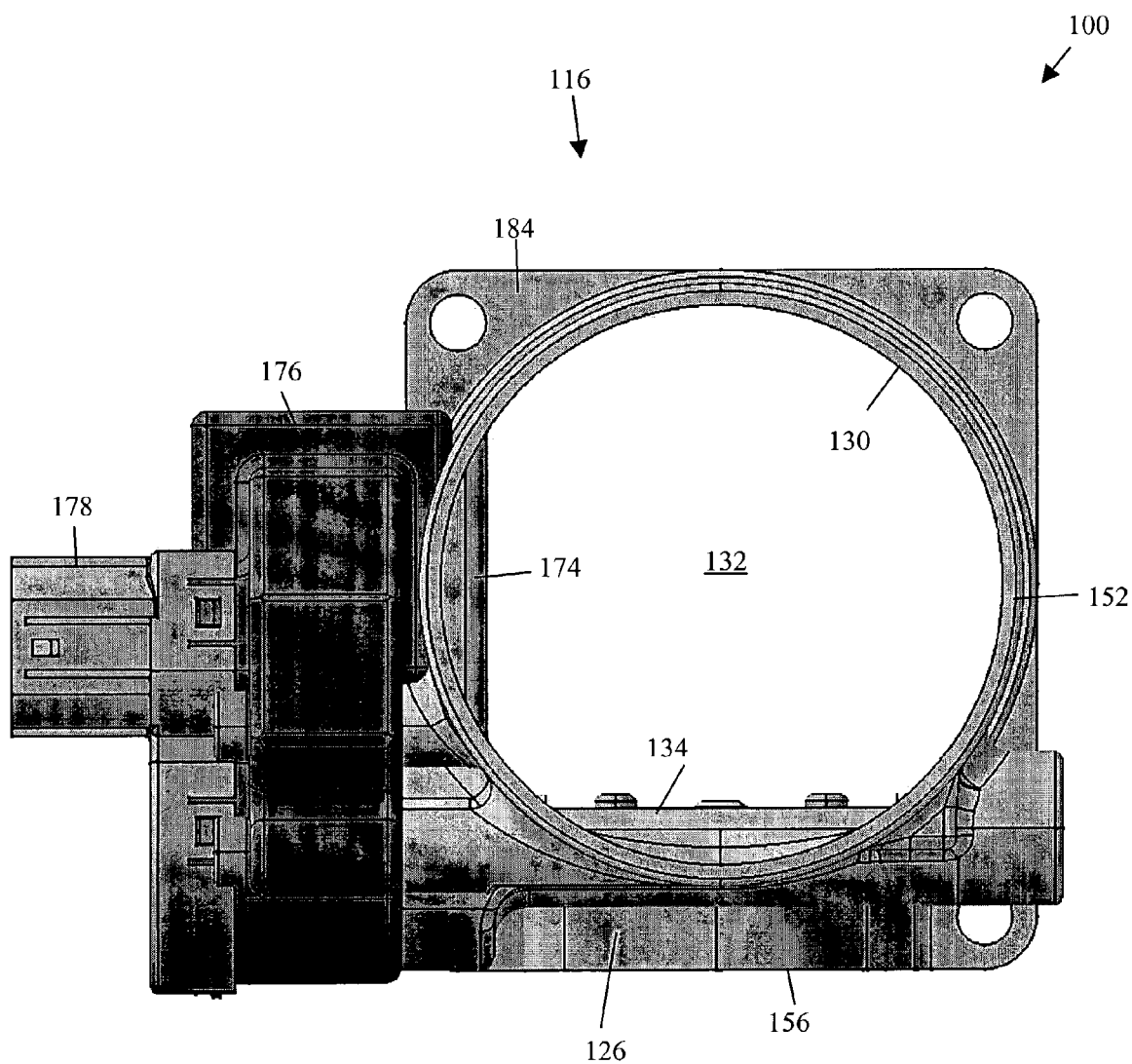
FIG. 5 is an end view of the flow control body according to FIG. 4.
Figure 6:
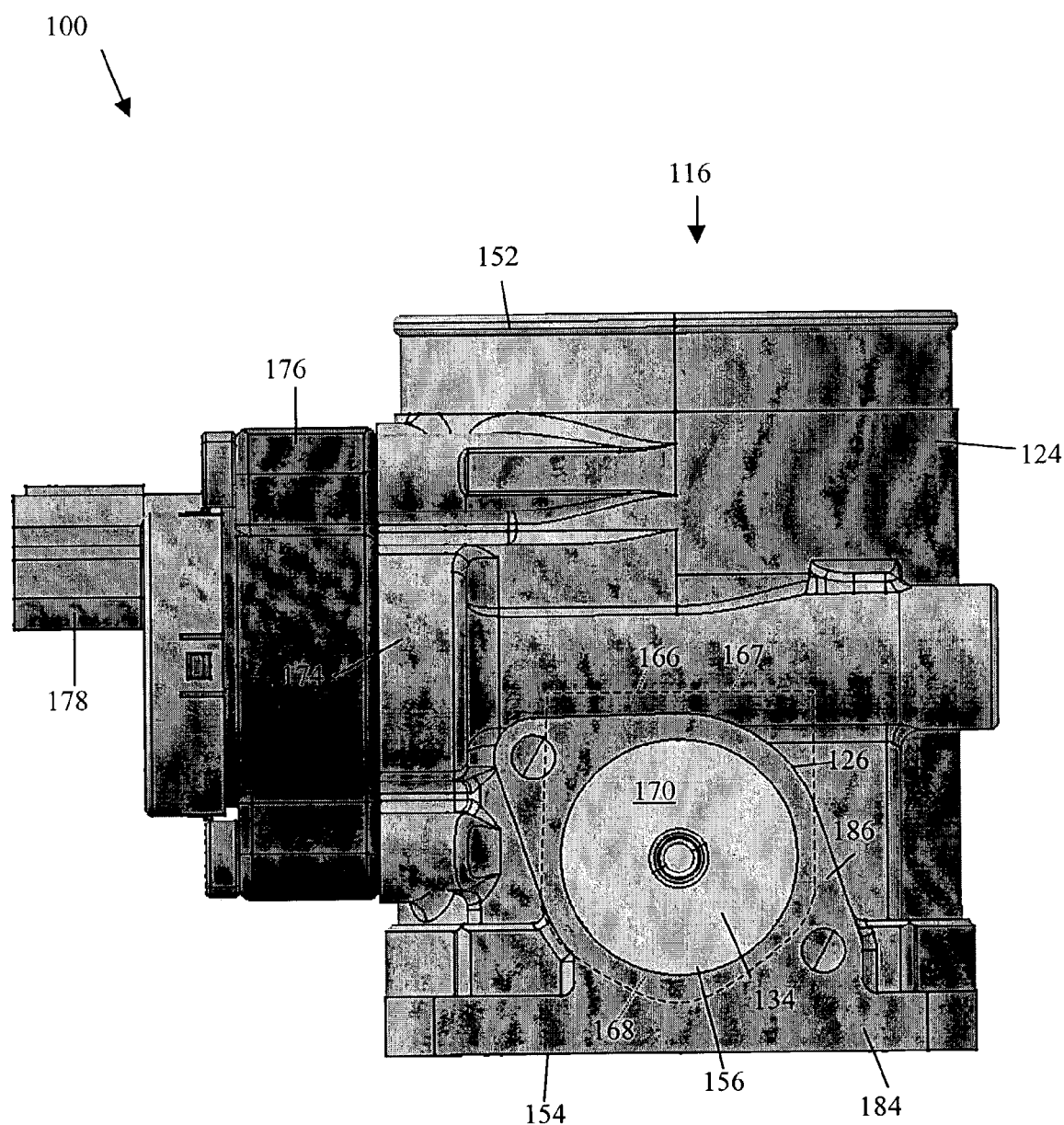
FIG. 6 is another perspective view of the flow control body according to FIG. 4 in a partially assembled state.

The manifold conduit 124 includes a recirculation opening 128 (in phantom in FIG. 4) and an inner surface 130 defining a fluid passageway 132. The recirculation opening 128 is in fluid communication with the inlet conduit 126. The inner surface 130 extends from a first open end 152 to a second open end 154. As shown in FIGS. 4 and 6, the first open end 152 includes a circular cross-sectional shape. FIGS. 4 and 5 show the second open end 154 to include a non-circular cross-sectional shape.

Referring to FIGS. 4 and 5, the inlet conduit 126 extends parallel to the manifold conduit 124 from the recirculation opening 128 to a third open end 156. The third open end 156 is adjacent to and co-planar with the second open end 154 of the manifold conduit 124 and includes a trapezoidal cross-sectional shape.

A common wall 160 forms a portion of the manifold conduit 124 and a portion of the inlet conduit 126. A compact size can be achieved for the flow control body 116 because the inlet conduit 126 extends parallel to the manifold conduit 124 and the common wall 160 is shared by the inlet conduit 126 and the manifold conduit 124. This compact size can improve the packaging efficiency of the EGR system around the engine and within the engine compartment.

Referring to FIG. 4, the common wall 160 can include the recirculation opening 128 (phantom), which is defined by a cylindrical wall or seat (not shown).

A closing member 134 is movably mounted in the manifold conduit 124 between a first position where the closing member 134 seals the recirculation opening 128 and blocks fluid communication between the intake conduit and the exhaust conduit (e.g., 12 and 14 of FIGS. 1–3) and a second position (not shown) where the closing member 134 opens the recirculation opening 128 and permits fluid communication between the intake conduit and the exhaust conduit and selectively meters the flow rate of exhaust gas passing into the intake conduit. FIGS. 4 and 5 show the closing member 134 in the first position represented schematically in FIG. 2.

Figure 7:
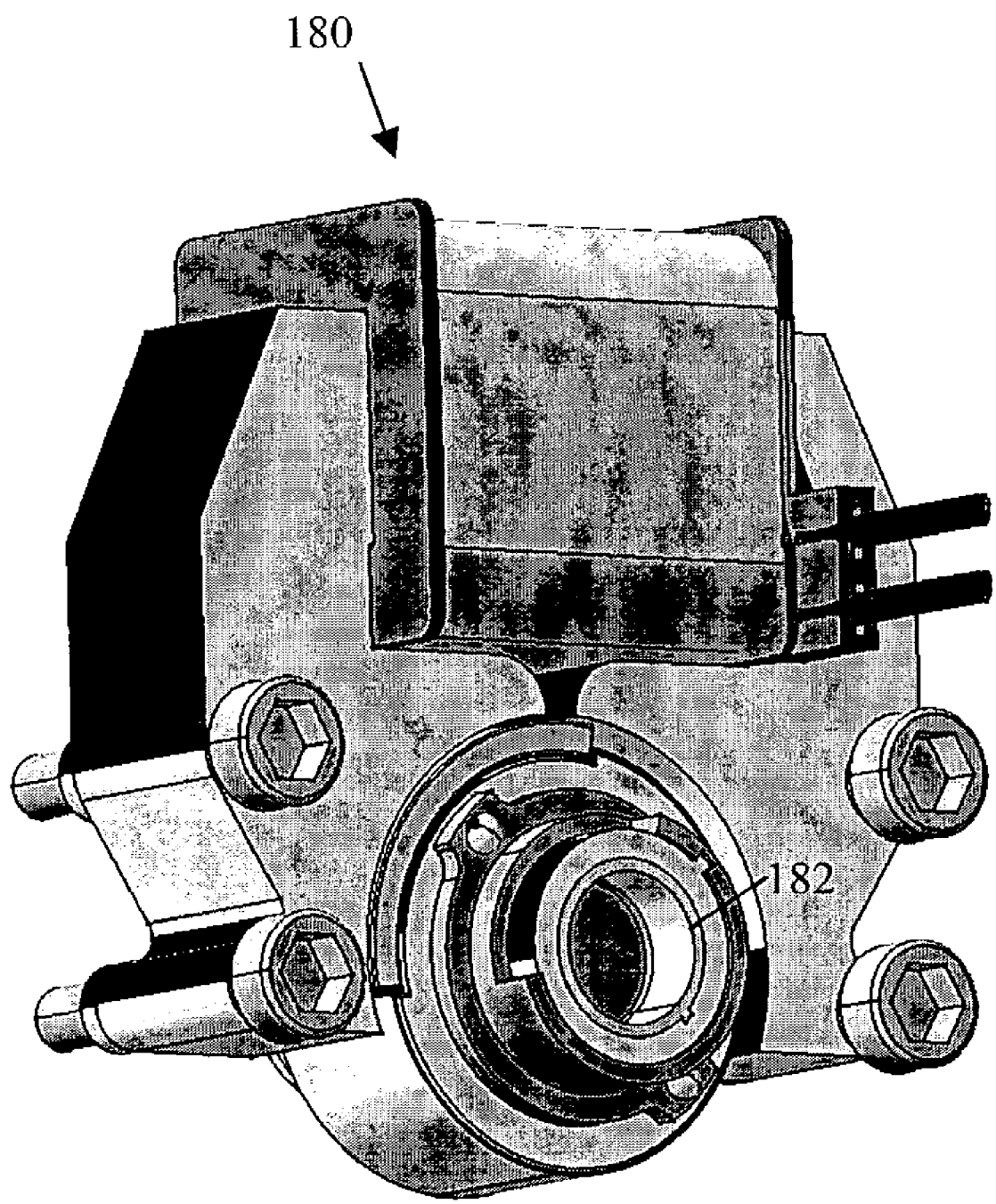
FIG. 7 is a perspective view of the actuator assembly according to FIG. 6.

Referring to FIGS. 4, 5 and 7, the closing member 134 includes a flapper door 162, a seal 164 on the flapper door 162. A rotary shaft 144 pivotally couples the flapper door 162 to the flow control body 116. The flapper door 162 has a rectangular base 166 and a semicircular end 168. The rectangular base 166 of the flapper door 162 is fixed to the rotary shaft 144. Referring to FIGS. 5 and 7, a cylindrical projection 170 extends from flapper door 162 adjacent the semicircular end 16. The seal 164 is mounted about the periphery of a cylindrical projection 170.

Referring to FIG. 5, when the flapper door 162 is in the first position, the cylindrical projection 170 extends through the recirculation opening 128 and the seal 164 engages the seat (not shown) to block the recirculation opening 128 and close fluid communication between the intake conduit and the exhaust conduit (see FIGS. 2 and 5). The electric actuator assembly 136 drives the rotary shaft 144 to pivot the flapper door 162 to the second position (not shown) such that the flapper door 162 extends away from the recirculation opening 128 and into the fluid passageway 132.

Referring to FIGS. 6 and 7, the electric actuator assembly 136 includes a servo assembly 138 drivingly coupled to the closing member 134 and a servo controller (not shown) electrically connected to the servo assembly 138, and a return spring 142 connected to the closing member 134. The return spring 142 biases the closing member 134 toward the first position. Preferably, the return spring 142 includes a torsion spring coiled about the rotary shaft 144 with one end secured to the rotary shaft 144 and the other end secured to the flow control body 116. Preferably, the servo assembly 138 includes an direct current electric motor 180 (FIG. 7) driving a gear train 182, with the gear train 182 driving the rotary shaft 144. Alternatively, the servo assembly 138 can include other driving arrangements, such as, a belt drive assembly driven by an electric motor, an electric torque motor with or without a gear train, or a solenoid with or without a linkage.

Referring to FIGS. 6 and 7, the gear train 182 can include an input rotary gear 186 coupled to the direct current electric motor 180 (FIG. 7) and an output gear segment 188 coupled to the rotary shaft 144. The gear train 182 can also include intermediate rotary gears 190, 192, 194, 196 engaged between the input rotary gear 186 and the output gear segment 188. Although four intermediate rotary gears 190, 192, 194, 196 are illustrated in FIGS. 6 and 7, any number of gears and gear ratios can be used to span the distance between the output rotary gear 186 and the input gear segment 188 in order to accommodate packaging constraints set for the direct current electric motor 180 and the rotary shaft 144 and the desired gear reduction. Preferably, the gear ratios are selected to apply an amount of torque sufficient to pivot the flapper door 162 into the fluid passageway 132 against the pressure of the fluid flowing in the fluid passageway and against the bias of the return spring 142.

A position sensor 198 is electrically connected to the closing member input (see for example, FIGS. 2 and 3) of an electronic servo controller (not shown—see for example, 40 of FIGS. 2 and 3) and provides a position signal that describes the position of the closing member 134 within the fluid passageway 132 of the manifold conduit 124. The position sensor 198 can be a contact sensor or a non-contact sensor. As shown in FIG. 6, the position sensor 198 can be mounted adjacent to the rotary shaft 144 and the output gear segment 188 to provide a signal that describes the angular displacement of the rotary shaft 144 when the closing member moves between the first position and the second position. Preferably, the position sensor 198 is mounted adjacent to the input gear 186 and sends a digital signal to the servo controller that represents the angular displacement of the input gear 186. This digital signal can provide a high resolution of the angular displacement of the input gear 186 to ensure that closing member 134 is properly located in the first position when it is desired to block and seal the recirculation opening 128.

The electronic servo controller generates a actuator signal and sends it to the servo assembly 138 to move the closing member 134 from the first position to the second position against the bias of the return spring 142. Preferably, the electronic servo controller follows a closed-loop algorithm using an engine performance data input and a closing member position input. Alternatively, the electronic servo controller can follow an open-loop algorithm and additional inputs can be provided to the electronic servo controller, such as transmission gear selection and vehicle inclination.

According to a preferred closed-loop control algorithm employed by the electronic servo controler signals describing engine data and closing member position data are detected by the electronic servo controller. The engine data can include engine load, engine speed, and mass airflow. To ensure proper and efficient operation of the engine, a total fluid flow into the engine is mapped as a function of engine load and engine speed and stored in the electronic servo controller. The sum of an amount of fluid flowing in the fluid passageway 132 measured by a mass airflow sensor positioned upstream of the recirculation opening 128 plus an amount of exhaust gas passing through the recirculation opening 128 should be equal to the total fluid flow. The electronic servo controller selects from stored data a closing member position value based on the data that was detected in order to achieve the desired total fluid flow. The electronic servo controller outputs a drive signal to the direct current electronic motor 180 to pivot the closing member 134 to the selected closing member position value.

Referring to FIGS. 4–6, the flow control body 116 also can include an actuator receptacle 174 extending from the manifold conduit 124. The electric actuator assembly 136 is received in the actuator receptacle 174. As shown in FIGS. 4 and 5, an actuator cover 176 extends over the electric actuator assembly 136 and connects to the actuator receptacle 174 to enclose the electric actuator assembly 136. Referring to FIGS. 4 and 6, the actuator cover 176 can include an electrical receptacle 178 electrically connected to the servo controller.

Referring to FIGS. 4 and 5, a ramp 172 is located in the fluid passageway 132 of the manifold conduit 124 adjacent the rectangular base 166 of the flapper door 162. The ramp 172 extends from the inner surface 130 of the manifold conduit 124 to a height at least equal to the thickness of the closing member 134. The ramp 172 deflects fluid flowing through the fluid passageway 132 away from the closing member 134 when the closing member is in the first position. This minimizes disturbance by the closing member 134 to the fluid flowing in the fluid passageway 132 when the closing member 134 is in the first position.

Other arrangements are possible to minimize disturbance by the closing member 134 of the fluid flowing through the fluid passageway 132 when the closing member 134 is in the first position, such a, providing a recess in the inner surface 130 to receive the closing member 134, as described with reference to FIGS. 2 and 3.

As shown in FIGS. 4–6, it is preferable to space a plurality of bolt flanges 184 about the perimeter of the second open end 154 and the third open end 156. The bolt flanges 158 are adapted to receive bolts for securing the flow control body 116 to the intake conduit and the recirculation conduit. Alternatively, other arrangements can be used to secure the flow control body 116 to the intake conduit and the recirculation conduit, such as, clamps, crimped flanges, solder, and flexible conduit.

While the present invention has been disclosed with reference to certain embodiments, numerous modifications, alterations and changes to the described embodiments are possible without departing from the sphere and scope of the present invention, as defined in the appended claims.

Accordingly, it is intended that the present invention not be limited to the described embodiments, but that it has the full scope defined by the language of the following claims, and equivalents thereof.

What I claim is:

1. An exhaust gas recirculation assembly for an engine including an intake manifold and an exhaust manifold, the exhaust gas recirculation assembly comprising:
    a flow control body including:
        a manifold conduit including a recirculation opening and a mounting member, the mounting member being adapted to connect the manifold conduit in fluid communication with the intake manifold; and
        an inlet conduit in fluid communication with the manifold conduit and including a mounting member adapted to connect the inlet conduit in fluid communication with the exhaust manifold;
    a closing member movably mounted in the manifold conduit and having a first position where the closing member closes the recirculation opening and blocks fluid communication between the inlet conduit and the manifold conduit and a second position where the closing member opens the recirculation opening and permits fluid communication between the inlet conduit and manifold conduit and creates a pressure differential across the recirculation opening to mix fluid flowing from the inlet conduit with fluid flowing in the manifold conduit, the closing member being operable as a single actuator for controlling an amount of the fluid flowing directly from the engine in the manifold conduit to mix with the fluid flowing from the inlet conduit;
    an electric motor coupled to the closing member; and
    an electronic controller electrically connected to the electric motor and selectively controlling the operation of the electric motor to drive the closing member between the first position and the second position such that the fluid from the inlet conduit is mixed with the fluid flowing in the manifold conduit in a sufficient amount for combustion in the engine.

2. The exhaust gas recirculation assembly according to claim 1, wherein the electronic controller comprises a closed loop controller.

3. The exhaust gas recirculation assembly according to claim 2, wherein the electronic controller further comprises:
    an engine data input; and
    a closing member position input.

4. The exhaust gas recirculation assembly according to claim 3, further comprising a position sensor electrically connected to the closing member position input and providing a position signal describing the position of the closing member within the manifold conduit.

5. The exhaust gas recirculation assembly according to claim 4, wherein the closing member comprises a rotary shaft mounted in the manifold conduit such that the closing member pivots between the first position and the second position; and
    the position sensor includes a non-contact sensor mounted adjacent to the rotary shaft and generates a signal indicative of the angular displacement of the rotary shaft when the closing member moves between the first position and the second position.

6. The exhaust gas recirculation assembly according to claim 1, further comprising a gear train coupling the electric motor to the closing member.

7. The exhaust gas recirculation assembly according to claim 6, wherein the electric motor comprises a direct current electric motor.

8. The exhaust gas recirculation assembly according to claim 7, wherein the gear train comprises:
    an input gear element coupled to the direct current electric motor; and
    an output gear element coupled to the closing member and driven by the input gear element to move the closing member between the first position and the second position.

9. The exhaust gas recirculation assembly according to claim 8, wherein the input gear element comprises an input rotary gear; and
    the output gear element includes a gear segment.

10. The exhaust gas recirculation assembly according to claim 9, wherein the gear train further comprises an intermediate rotary gear wheel between the input rotary gear and the gear segment.

11. The exhaust gas recirculation assembly according to claim 10, further comprising a rotary shaft mounted in the manifold conduit and connected to each off the closing member and the gear segment such that when a servo assembly drives the rotary shaft, the closing member pivots between the first position and the second position.

12. The exhaust gas recirculation assembly according to claim 11, further comprising a non-contact sensor mounted adjacent to the gear segment, and electrically connected to the electronic controller; and
    the position signal indicates an angular displacement of the gear segment when the electric motor pivots the closing member between the first position and the second position.

13. The exhaust gas recirculation assembly according to claim 11, further comprising a spring connected to the closing member and biasing the closing member toward the first position; and
    the electric motor pivots the closing member from the first position to the second position against the bias of the spring.

14. The exhaust gas recirculation assembly according to claim 1, wherein the electric motor and the electronic controller are mounted on the flow control body.

15. The exhaust gas recirculation assembly according to claim 1, further comprising an electrical power receptacle mounted on the flow control body and electrically connected to the electronic controller.

16. A modular exhaust gas recirculation assembly comprising:
    a flow control body including:
        a manifold conduit including an inner surface defining a fluid passageway;
        an inlet conduit in fluid communication with the manifold conduit; and
        an actuator receptacle extending along at least a portion of one of the manifold conduit and the inlet conduit;
    a closing member movable mounted in the manifold conduit and having:
        a first position where the closing member lies adjacent to the inner surface of the manifold conduit and blocks fluid communication between the manifold conduit and the inlet conduit; and
        a second position where the closing member extends into the fluid passageway of the manifold conduit and opens fluid communication between the manifold conduit and the inlet conduit such that when fluid is flowing through the manifold conduit fluid flowing in the inlet conduit is drawn into the manifold conduit, the closing member being operable as a single actuator for controlling an amount of the fluid flowing directly from the engine in the manifold conduit to mix with the fluid flowing from the inlet conduit;

an electric actuator assembly mounted in the actuator receptacle, coupled to the closing member and driving the closing member between the first position and the second position; and an actuator cover extending over the electric actuator assembly and connected to the actuator receptacle to enclose the electric actuator assembly.

17. The modular exhaust gas recirculation according to claim 16, wherein the electric actuator assembly comprises:

a spring connected to the closing member and biasing the closing member toward the first position;

a servo assembly coupled to the closing member and driving the closing member toward the second position against the bias of the spring; and a servo controller electrically connected to the servo assembly and signaling the servo assembly to move the closing member between the first position and the second position.

18. The modular exhaust gas recirculation assembly according to claim 17, further comprising a rotary shaft mounted an the flow control body and connected to the closing member, and the spring includes a torsion spring coaxially mounted about the rotary shaft.

19. The modular exhaust gas recirculation assembly according to claim 17, wherein the servo assembly comprises:

a direct current electric motor; and a gear train coupled to the direct current electric motor and the rotary shaft such that the direct current electric motor drives the gear train to pivot the closing member from the first position to the second position against the bias of the spring.

20. The modular exhaust gas recirculation assembly according to claim 17, wherein the servo controller comprises a closed-loop controller including:

an engine data input; and a closing member position input.

21. The modular exhaust gas recirculation assembly according to claim 20, wherein the actuator cover comprises an electrical power receptacle electrically connected to the servo controller.

22. A method for controlling exhaust gas recirculation for an internal combustion engine including a manifold conduit in fluid communication with an inlet conduit, and a closing member selectively opening and closing the fluid communication between the manifold conduit and the inlet conduit, the method comprising the step of:

driving an electric motor to position the closing member within the manifold conduit at one of a first position where the closing member blocks fluid communication between the manifold conduit and the inlet conduit and a second position where the closing member opens fluid communication between the manifold conduit and the inlet conduit so as to create a pressure differential to mix fluid flowing from the inlet conduit with fluid flowing in the manifold conduit, the closing member being operable as a single actuator for controlling an amount of the fluid flowing directly from the engine in the manifold conduit to mix with the fluid flowing from the inlet conduit.

23. The method according to claim 22, wherein the electric motor is a direct current electric motor.

24. The method according to claim 22 further comprising the steps of:

detecting engine data;

detecting closing member position data describing a position of the closing member within the manifold conduit; and selecting a closing member position angle based on the engine data and the closing member position data such that the closing member position angle corresponds to one of the first position and a second position.

25. The method according to claim 24, further comprising:

biasing the closing member toward the first position; and the step of driving includes the step of driving the electric motor against the bias on the closing member to position the closing member in the second position.

* * * * *